US010074193B2

(12) United States Patent
Lobaugh et al.

(10) Patent No.: US 10,074,193 B2
(45) Date of Patent: Sep. 11, 2018

(54) CONTROLLED DYNAMIC DETAILING OF IMAGES USING LIMITED STORAGE

(71) Applicant: Microsoft Technology Licensing, LLC, Redmond, WA (US)

(72) Inventors: Jonathan W. Lobaugh, Bothell, WA (US); Marius Ionescu, Kirkland, WA (US); Tyson Matanich, Issaquah, WA (US); Simon Gordon, Woodinville, WA (US); Kevin Paul, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/285,396

(22) Filed: Oct. 4, 2016

(65) Prior Publication Data
US 2018/0096496 A1   Apr. 5, 2018

(51) Int. Cl.
G06T 11/00 (2006.01)
G06T 1/20 (2006.01)
G09G 5/02 (2006.01)
G06F 3/048 (2013.01)
H04N 1/60 (2006.01)
H04N 9/73 (2006.01)
H04N 5/57 (2006.01)
G06F 3/0484 (2013.01)

(52) U.S. Cl.
CPC ........ *G06T 11/001* (2013.01); *G06F 3/04845* (2013.01); *G06T 1/20* (2013.01); *G06T 2200/24* (2013.01)

(58) Field of Classification Search
CPC combination set(s) only.
See application file for complete search history.

(56) References Cited

U.S. PATENT DOCUMENTS 6,100,899 A * 8/2000 Ameline ............... G09G 5/393
                                                        345/605
7,694,324 B2   4/2010 McDowell et al.
7,746,345 B2   6/2010 Hunter
(Continued)

OTHER PUBLICATIONS

Adam Johnson, Cryengine 3 Manual-Blend Layer, Jan. 2014, pp. 1-5.*

(Continued)

*Primary Examiner* — Wesner Sajous
(74) *Attorney, Agent, or Firm* — Klarquist Sparkman, LLP

(57) ABSTRACT

Examples of memory-efficient techniques for dynamically generating images having customizable image portions are disclosed herein. In particular embodiments, a collection of contributing images with different image information in the contributing image's channel layers is used to generate a composite result image. By combining the subimage data from each channel of the contributing image in accordance with a composite image function, a resultant composite image can be generated that has the desired customized properties selected by the user. To create the customized properties, one or more of the color channel subimages can have their values scaled (e.g., using matrix multiplication) according to the customization preferences of the user such that, when combined with the other contributing images, the desired customized result is presented to the user.

20 Claims, 19 Drawing Sheets
(13 of 19 Drawing Sheet(s) Filed in Color)

(56) References Cited

U.S. PATENT DOCUMENTS

| | | |
|---|---|---|
| 7,859,551 B2 | 12/2010 | Bulman et al. |
| 8,147,339 B1 | 4/2012 | Perry |
| 8,840,475 B2 | 9/2014 | Perlman et al. |
| 9,084,936 B2 | 7/2015 | Perlman et al. |
| 2002/0154214 A1 | 10/2002 | Scallie et al. |
| 2003/0137506 A1 | 7/2003 | Efran et al. |
| 2007/0019882 A1* | 1/2007 | Tanaka .................. G06T 17/20 382/276 |
| 2008/0094411 A1* | 4/2008 | Parenteau ............. G06T 15/503 345/592 |
| 2011/0248992 A1 | 10/2011 | van Os et al. |
| 2014/0193068 A1* | 7/2014 | Harvill .................. H04N 1/387 382/164 |
| 2015/0338648 A1 | 11/2015 | Tait |
| 2016/0217749 A1* | 7/2016 | Aggarwal ............. G09G 3/3406 |

OTHER PUBLICATIONS

Bauer, "Image-based rendering for real-time applications," *Proc. Central European Seminar on Computer Graphics*, 7 pp. (May 2005).

\* cited by examiner

BASE IMAGE - 100
(W/ RGBA DATA)

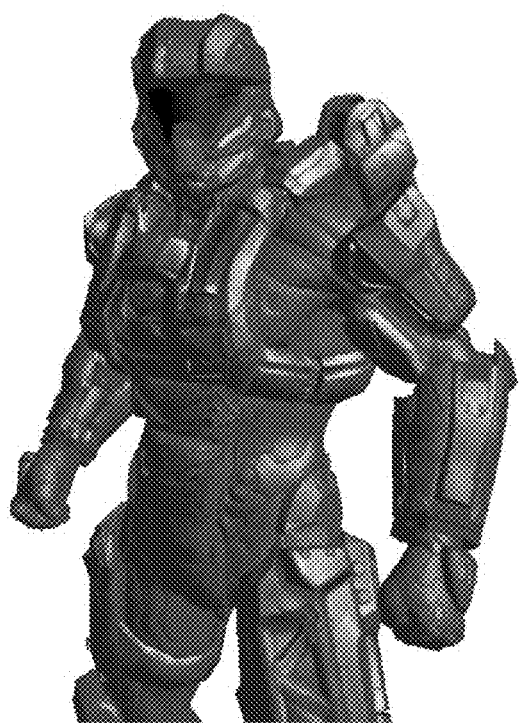
LIGHTING IMAGE - 300
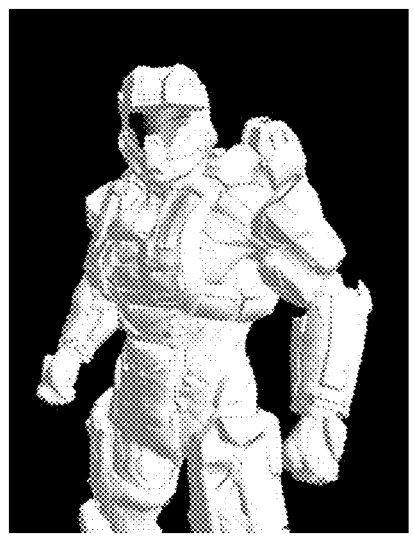
RED CHANNEL
SUBIMAGE - 310
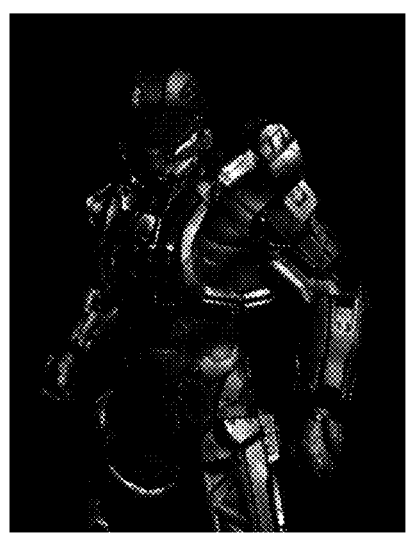
GREEN CHANNEL
SUBIMAGE - 312
FIG. 3

500

510 { ((*base* + [(control.RedChannel * PrimaryColor + control.GreenChannel * SecondaryColor) + (control.GreenChannel * control.BlueChannel * PrimaryVisorColor + control.BlueChannel * SecondaryVisorColor)]) * lighting.RedChannel) + lighting.GreenChannel

```
((base + [(control.RedChannel * PrimaryColor + control.GreenChannel *
SecondaryColor) + (control.GreenChannel * control.BlueChannel *
PrimaryVisorColor + control.BlueChannel * SecondaryVisorColor)]) *
lighting.RedChannel) + lighting.GreenChannel
```

610

700

710 { (((*base* + [(*control.RedChannel* * *PrimaryColor* + *control.GreenChannel* * *SecondaryColor*) + (control.GreenChannel * control.BlueChannel * PrimaryVisorColor + control.BlueChannel * SecondaryVisorColor)]) * lighting.RedChannel) + lighting.GreenChannel

```
     ⎧ ((base + [(control.RedChannel * PrimaryColor + control.GreenChannel *
810 ⎨   SecondaryColor) + (control.GreenChannel * control.BlueChannel *
     ⎩   PrimaryVisorColor + control.BlueChannel * SecondaryVisorColor)]) *
         lighting.RedChannel) + lighting.GreenChannel
```

900

910 { ((base + [(control.RedChannel * PrimaryColor + control.GreenChannel * SecondaryColor) + (control.GreenChannel * control.BlueChannel * PrimaryVisorColor + *control.BlueChannel * SecondaryVisorColor*)]) * lighting.RedChannel) + lighting.GreenChannel 1010 { ((base + [(control.RedChannel * PrimaryColor + control.GreenChannel * SecondaryColor) + (control.GreenChannel * control.BlueChannel * PrimaryVisorColor + control.BlueChannel * SecondaryVisorColor)]) * lighting.RedChannel) + lighting.GreenChannel

1100

1110 { ((base + [(control.RedChannel * PrimaryColor + control.GreenChannel * SecondaryColor) + (control.GreenChannel * control.BlueChannel * PrimaryVisorColor + control.BlueChannel * SecondaryVisorColor)]) * lighting.RedChannel) + lighting.GreenChannel

1200

1210 { ((base + [(control.RedChannel * PrimaryColor + control.GreenChannel * SecondaryColor) + (control.GreenChannel * control.BlueChannel * PrimaryVisorColor + control.BlueChannel * SecondaryVisorColor)]) * Lighting.RedChannel) + lighting.GreenChannel

1300

1310 {((base + [(control.RedChannel * PrimaryColor + control.GreenChannel * SecondaryColor) + (control.GreenChannel * control.BlueChannel * PrimaryVisorColor + control.BlueChannel * SecondaryVisorColor)]) * Lighting.RedChannel) + Lighting.GreenChannel

EXAMPLE VARIABLE REPRESENTATIONS

1410 $\Big\{$ 
Base   Customization   Lighting
1-4        5-7          8-10
([R,G,B,A],[R,G,B],[R,G,B],. . . color1, color2, color3, color4, . . . )

1412 $\Big\{$ ([var1,var2,var3,var4],[var5,var6,var7,var8],[var9,var10,var11,var12] ,. . . color 1, color 2, color 3, color 4, . . . )

EXAMPLE COMPOSITE IMAGE FUNCTIONS

1420 $\Big\{$ Return=(((var1,var2,var3,var4)+(var5*color1 + var6*color2)+(var7*var6*color3 + var7*color4))*var8) + var9

1422 $\Big\{$ Return=(var1,var2,var3,var4) + var5*color1 + var6*color2 + var7*color3 + var8*color4 + var9*color5 + var10*color6

1424 $\Big\{$ Return=((var1,var2,var3,var4)+(var5*color1 + var6*color2 + Var7*color3) + (var8*var7*color4 + var9*color5) + (var10*color6 + var11*color7) + (var12*var13*color8 + var13*color9)) + var14

FIG. 14

CONTROLLED DYNAMIC DETAILING OF IMAGES USING LIMITED STORAGE

FIELD

This application relates to memory-efficient techniques for dynamically generating images having customizable image portions.

SUMMARY

The disclosed technology concerns methods, apparatus, and systems for reducing the memory overhead and improving the image generation process for customizable images. The disclosed methods, apparatus, and systems should not be construed as limiting in any way. Instead, the present disclosure is directed toward all novel and nonobvious features and aspects of the various disclosed embodiments, alone or in various combinations and subcombinations with one another.

In particular embodiments, a collection of contributing images with different image information in the contributing image's channel layers is used to generate a composite result image. By combining the subimage data from each channel of the contributing image in accordance with a composite image function, a resultant composite image can be generated that has the desired customized properties selected by the user. To create the customized properties, one or more of the color channel subimages can have their values scaled (e.g., using matrix multiplication) according to the customization preferences of the user such that, when combined with the other contributing images, the desired customized result is presented to the user. By separating customization and data, orders of magnitude of memory can be saved, as the alternative of pre-rendering and storing all combinations can require a significant amount of memory resources and time.

The innovations can be implemented as part of a method, as part of a computing system configured to perform the method, or as part of computer-readable media storing computer-executable instructions for causing a processing device (e.g., a circuit, such as a microprocessor or microcontroller), when programmed thereby, to perform the method. The various innovations can be used in combination or separately.

The foregoing and other objects, features, and advantages of the disclosed technology will become more apparent from the following detailed description, which proceeds with reference to the accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 1-3 show example contributing images that can be combined to form a final composite image.

FIG. 14 is a schematic block diagram showing various example variables and functions that illustrate how the disclosed technology can be generalized for any image having customizable portions.

DETAILED DESCRIPTION

I. General Considerations

Figure 1:
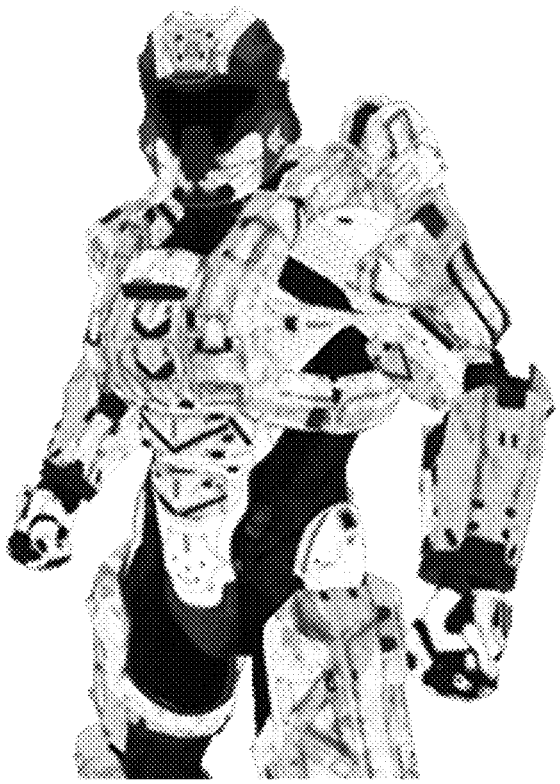

Disclosed below are representative embodiments of methods, apparatus, and systems for storing and generating image variations. The disclosed methods have particular application to internet browsers displaying a web page through which the user can select to alter the color details of an image being displayed on the browser.

The disclosed methods, apparatus, and systems should not be construed as limiting in any way. Instead, the present disclosure is directed toward all novel and nonobvious features and aspects of the various disclosed embodiments, alone or in various combinations and subcombinations with one another. Furthermore, any features or aspects of the disclosed embodiments can be used in various combinations and subcombinations with one another. For example, one or more method acts from one embodiment can be used with one or more method acts from another embodiment and vice versa. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

Further, although this disclosure primarily references the RGB color space, the technology is applicable to any suitable color space representation (e.g., YUV, CMYK, YIQ, YPbPr, xvYCC, HSV, HSL, and the like).

As used in this application and in the claims, the singular forms "a," "an," and "the" include the plural forms unless the context clearly dictates otherwise. Additionally, the term "includes" means "comprises." Further, as used herein, the term "and/or" means any one item or combination of any items in the phrase.

II. Introduction to the Disclosed Technology

Many websites allow a user to customize an object being displayed in the browser window. For example, for an auto manufacturer website, the user might be able to select the color of a vehicle being displayed, particular trim packages, wheel sizes, etc. For a clothing manufacturer, the user might be able to select the color (or combination of colors) of an item of apparel being displayed. For a video game website, the user might be able to select the color (or combination of colors) for an in-game avatar; for instance, the user may be allowed to customize the color of the armor, helmet, skin, eyes, etc. of the character that they portray in the game. This type of customization typically allows a user to explore the various color options (or other details) before committing to a particular selection.

In some cases, the number of possible color combinations is small enough that images of all such combinations can be pre-rendered and stored at a web server. Then, when a particular combination is selected by the user, the image data for the selected combination can be transmitted to the user's computer for display on the web browser. Such pre-rendering also helps ensure that the image can be quickly provided to the user, enhancing the user experience.

More commonly, however, the number of possible color combinations may be relatively large (e.g., more than 1000, more than 10,000, more than 100,000, more than 1,000,000), in which case the amount of memory necessary to store the pre-rendered images becomes undesirably large. Pre-generating millions of combinations requires a significant amount of storage, which can cost significant amounts of money and become unfavorable to maintain. This is especially true in the context of video game character customizations, which commonly include large numbers of character and color options. For instance, in one nonlimiting example, the user might be able to select from 175 armors, 175 helmets, 54 visors, 33 primary colors, 33 secondary colors, and 2 genders, resulting, there in ~3.6 Billion combinations of possible characters. Assuming each image is 288 KB, over 1000 TB of data would have to be stored. Accordingly, improved and less-memory-intensive tools and techniques for generating customizable images are desired.

The disclosed technology concerns tools and techniques for significantly reducing the memory overhead and improving the image generation process for customizable images being displayed on a website or as part of a stand-alone program. For instance, for the example in which 175 armors, 175 helmets, 54 visors, 33 primary colors, 33 secondary colors, and 2 genders are selectable by the user, embodiments of the disclosed technology can be used to reduce the amount of data to be stored in order to ~40 GB of data— orders of magnitude less than if all images were pre-rendered.

The disclosed technology has particular application to websites offering such customization because web browsers and the computers on which they run typically offer significantly less processing power, have a variety of hardware limitations, and have limited storage available to process the vast number of combinations that the user can choose. Further, the illustrative examples presented in FIGS. 1-13 primarily involve customization of a video game character, sometimes referred to herein as a "Spartan". This particular application is by way of illustrative example only and is not limiting in any way. Indeed, the principles of the technology can be more broadly applied to any website or application having user-selectable customization of an object or character being displayed to the user (such as those described at the beginning of this section).

III. Example Embodiments of Disclosed Technology

Instead of trying to compose and store a unique image for each possible combination, certain example embodiments of the disclosed technology use a set of contributing images with unique image data to generate a final composite image. The contributing images allow for the generation of a result image that can have user customizations applied dynamically. This significantly reduces the number of images to be pre-generated and greatly lowers the memory overhead while still achieving the desired effect of on-demand, substantially real-time, image customization.

In particular embodiments, a collection of contributing images with different image information in the contributing image's channel layers is used to generate a resultant composite image. For example, by compositing the subimage data from each channel of the contributing images in accordance with a composite image function, a composite result image can be generated that has the desired customized properties selected by the user. Further, in particular embodiments, one or more of the color channel subimages can have their values scaled (e.g., using matrix multiplication resulting in an RGB array (an m×n×3 array) according to the customization preferences of the user such that, when combined with the other contributing images, the desired customized result is presented to the user. This process is sometimes referred to as customization by matrix multiplication. Separating customization and data allows one to save orders of magnitude of space. The alternative of storing all combinations can be extremely costly and require a significant amount of memory resources and time.

Figure 2:
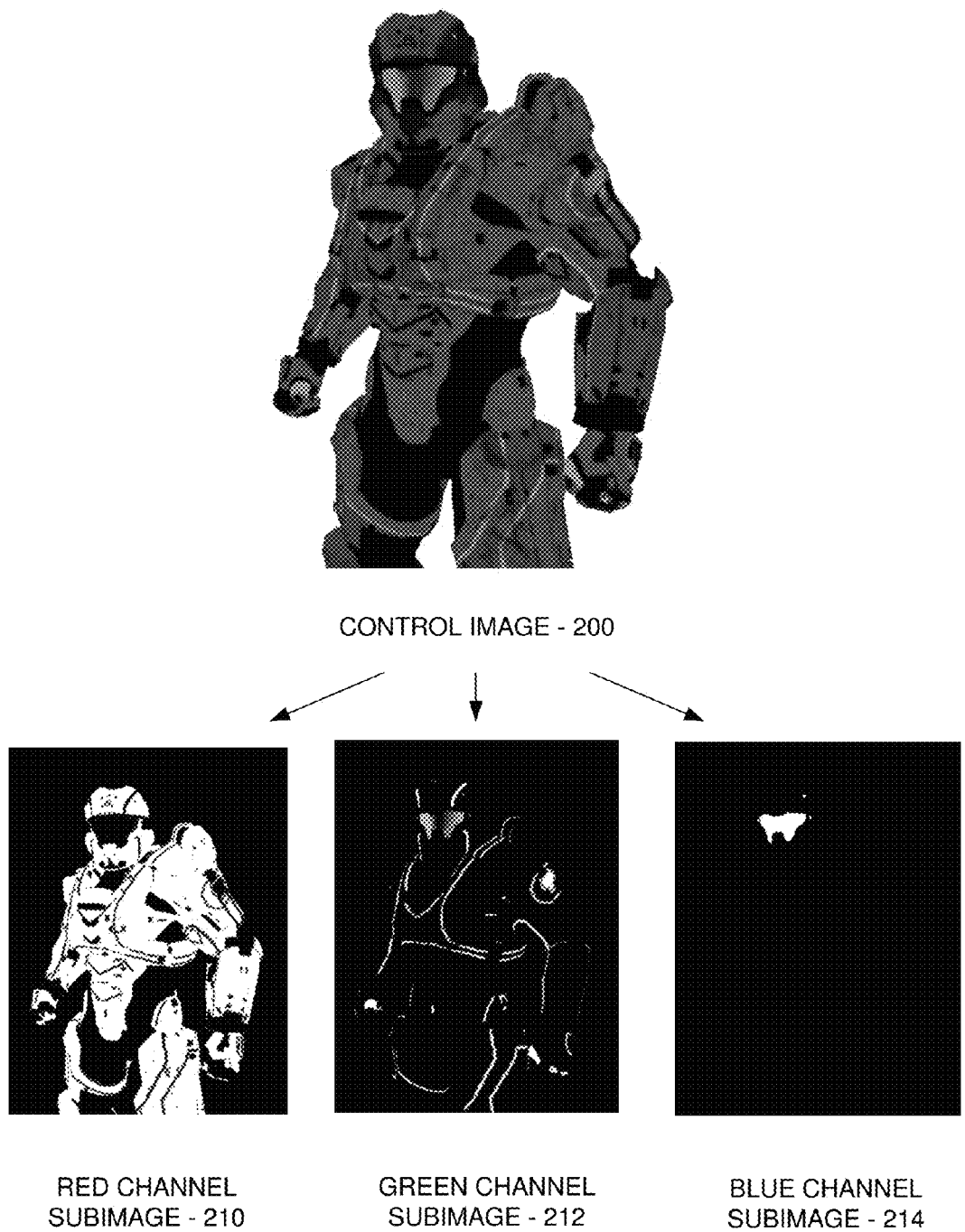

FIGS. 1-14 further illustrate how one or more contributing images, which can be further subdivided into images along individual color channels (sometimes referred to as "subimages" or "color channel subimages"), can be used to implement the principles of the disclosed technology. In particular, FIGS. 1-3 show example contributing images 100, 200, 300 that can be combined to form a final composite image according to a composite image function. In particular, FIGS. 1-3 show exemplary arrays of image data that form contributing images 100, 200, 300; FIGS. 2-3 show how contributing images 200, 300 can be further subdivided into color channel images (subimages) that are combinable to form the respective contributing images 200, 300.

In accordance with one example embodiment, the final composite image comprises contributions from three contributing images: a base image, a control image, and a lighting image. In this embodiment, the base image 100 (e.g., as shown in FIG. 1) comprises a m×n×3 array of RGB image data (or YUV image data, or other three component color space representation) or an m×n×4 array of RGBA of image data (or YUVA, or other four component color space representation) showing the core of the image to be displayed to the user. In this illustrated example, the image data mostly includes non-color grayscale values, but can include color values if desired. For instance, if there are colored portions of the final image that are non-customizable, those portions can appear in the base image in color. In FIG. 1, for instance, some orange details on the top of the Spartan avatar's helmet are shown. The image data in this base image indicates, for example, the outline and features of the object to be displayed along with some basic grayscale shading to highlight contrast differences between the features of the object of the image. The image data for the base image can also include an alpha channel array for controlling the translucency of the pixels of the base image. For example, the alpha channel array can be set such that only the pixels defining the Spartan avatar appear as opaque or partially opaque (e.g., along the edges of the avatar) and all other pixels surrounding the avatar are translucent.

In certain embodiments, this base image serves as the underlying base (or model) on which additional image layers can be overlayed to create the final composite image. One or more so-called "control images" (e.g., as shown in FIG. 2) can be used to provide the color layers that, in certain embodiments, provide the customizable options supported by the disclosed technology. Further one or more "lighting images" (e.g., as shown in FIG. 3) can be used to provide one or more types of lighting effects to the final composite image.

Before describing the operation of the control image of FIG. 2, the lighting subimages of FIG. 3 are discussed. FIG. 3 is a composite image 300 resulting from the composition of two color channel subimages 310, 312 and the base image. In this example, red channel subimage 310 is an m×n array of values showing diffuse lighting effects and green channel subimage 312 is an m×n array of values showing specular lighting effects. It will be appreciated that any of the available RGBA color channels could have been used to store this information. As will be explained more detail below, the lighting subimages 310, 312 are used when generating the final composite image to provide lighting effects. Further, the lighting subimages of FIG. 3 need not be used at all during the generation of the final composite image. For instance, lighting effects could be absent from the final image or the lighting effects might be included as part of the base image. Additionally, some embodiments have only one of the two lighting subimages described. Still further, some embodiments include additional or other combinations of lighting subimages to provide other lighting effects in the final composite image.

Turning now to FIG. 2, FIG. 2 shows a composite image 200 resulting from the base image 100 being combined with three color channel subimages 210, 212, 214 (e.g., in the R, G, and B color channels, or the Y, U, and V color channels, or other color space channels) that provide three different color channel subimages. In particular, in FIG. 2, three two-dimensional m×n color channel subimages (layers) 210, 212, 214 of image data are shown. It should be noted that the color channel subimages 210, 212, 214 are not typically related to the color identification of their corresponding channel (e.g., red, blue, or green); instead, the disclosed technology takes advantage of the "color" channels as providing an available mechanism (data structure) for generating and storing ranges of image values (e.g., 0 to 1, 0 to 255, or other such range, depending on the image format) that provide an available m×n image representation. This m×n representation can be expanded (e.g., via multi-dimensional matrix multiplication to create an RGB image (an m×n×3 array) having specific portions whose colors can be adjusted and having other portions that do not contribute to the composite image. In contrast to the color channel subimage used to create the expanded RGB image, the RGB values of the expanded RGB image will correspond to actual red, blue, and green color components (or YUV values, or other color space color components) that contribute to the final image. In particular embodiments, the subimage can have non-zero-valued pixels in portions of the image that are customizable and zero-valued pixels in portions of the image that are not customizable. For instance, and as described in more detail below, these color channel subimages can be modified by a multiplication operation (e.g., by a 1×3 vector) to create a resulting image with a complete set of RGB values (e.g., a m×n×3 array) where the non-zero RGB values represent a target color in the customizable portion of the image and the zero-valued RGB values do not contribute to the final composite image. As will be appreciated by those skilled in the art, the ability to use a small 1×3 vector to dynamically modify color values by multiplying that 1×3 vector by an m×n image array (used to define values to be modified and to effectively "mask" other values) vastly reduces the need to store individual pre-rendered images to show all possible color selections.

Figure 4:
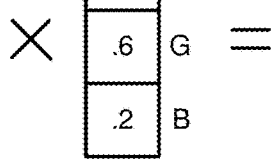
FIG. 4 is a schematic block diagram that illustrates an example of a color-customization-by-matrix-multiplication approach in more detail.

FIG. 4 is a schematic block diagram 400 that illustrates this color-customization-by-matrix-multiplication approach in more detail. In particular, block diagram 400 shows an example color channel subimage 410. Here, the color channel subimage is a 4×4 array (also referred to as a matrix) but would normally be much larger (depending on the resolution and size of the image) and can be generalized to any m×n array (matrix). Further, image data values shown in the color channel subimage 410 are shown as in the range of 0 to 1, but other formats and ranges are of course possible depending on the implementation (e.g., 0 to 255, etc.). The color channel subimage 410 could be contained in any available color channel (R, G, or B) or in the alpha channel, depending on the implementation. (In this regard, the term "color channel image" is intended to also encompass an image stored in the alpha channel and used to define customizable image portions as described herein.)

FIG. 4 also shows a 1×3 vector 412 that serves as the scaling factor. In general, the scaling factor 412 is selected such that, when multiplied by the values of the color channel image 410, it produces a complete set of RGB arrays after customization 414 whose RGB values correspond to a desired target color. Example individual RGB arrays that, when combined, result in the desired target for the customizable image portion are shown as R array 420, G array 422, and B array 424. In the illustrated embodiment, the values in the scaling factor 412 are variable and will depend on which color is desired to be produced.

A scaling factor conversion table (e.g., a look up table or other data structure) can be created for the set of available color options to be selectable by a user such that the correct scaling factor 412 can be quickly returned and used for any color selected from among the available options. In other embodiments, the scaling factor conversion table is omitted and the data sent by a user upon selecting a desired color is the scaling factor 412 itself. It will be appreciated that, in certain embodiments, the scaling factor 412 can itself correspond directly to the RGB value of the desired color. For instance, in embodiments where the color channel image comprises only minimum and maximum values (e.g., only 0s and 1s), the scaling factor 412 for a selected color could correspond to the RGB value itself (e.g., because when that RGB value is multiplied by "1" it produces an identical RGB value as the target; but when multiplied by "0", it returns "0" (black)).

In operation, a user viewing the composite image may select a customizable portion of that image and select a color to apply to that customizable portion. The appropriate scaling factor 412 can then be selected (e.g., by referencing a scaling factor conversion table), which is then multiplied by the corresponding color channel subimage representing the selected customizable portion, thereby producing the full (expanded) set of desired RGB values.

In some embodiments, the scaling factor can be applied to (e.g., multiplied with) an arithmetic combination of color channel subimages, such as a combination of one or more color channel subimages combined using suitable arithmetic operations (e.g., multiplication, addition, division, subtraction, etc).

Notably, the described approach allows for image portions to have colors customized "on demand", in substantially real time, making the approach dynamic rather than reliant on static pre-rendered images for each possible color selection.

The resulting RGB image 414 could potentially also have an alpha channel array that is used to control the translucency of the pixels in the RGB image. Further, the alpha channel array can be (or have values corresponding to) the color channel image 410. Thus, pixels in the resulting RGB image 414 having alpha values of "0" will be translucent and pixels having alpha values of "1" will be opaque.

In other embodiments, however, the alpha channel array from another one of the contributing images is used as the alpha channel array for the final composite image. For example, in the example embodiment illustrated in FIGS. 5-13, the alpha channel array of the base image is used to control the translucency of the pixels in the image. In that alpha channel array, pixel values exterior to the illustrated Spartan avatar are set to be translucent.

Returning now to FIG. 2, each color channel subimage 210, 212, 214 is an m×n array designed to have array values configured to identify image portions that can be customized (e.g., using any of the example memory-saving color customization processes described herein). In FIG. 2, for instance, the red-channel subimage 210 includes zero-value pixels (e.g., pixels that are set to "0", and thus appear as "black" pixels in the subimage) and non-zero-value pixels (e.g., pixels that are set to values greater than "0", such as "1", which appear as white in the subimage). Consequently, in color channel subimages 210, 212, 214, the black portions show image portions that are not modifiable using the color-customization-by-matrix-multiplication procedure described above and illustrated in FIG. 4 and disclosed elsewhere herein. This is because during the matrix multiplication, the scaling factor will be multiplied by a "0" pixel value, which of course results in "0" RGB values being returned. On the other hand, the white (or grayscale) portions of the color channel subimages 210, 212, 214 are dynamically adjustable using the color-customization-by-matrix-multiplication procedure described herein and illustrated in FIG. 4.

As can be seen in FIG. 2, for red channel subimage 210, the adjustable color portions correspond to the exterior of the armor of the Spartan avatar; for green channel subimage 212, the adjustable color portions correspond to details on the exterior of the armor and on the visor of the Spartan avatar; for blue channel subimage 214, the adjustable color portions correspond to the visor of the Spartan avatar.

In certain example embodiments, the values of the subimages are adjusted such that they only include maximal or minimal values. For instances, the values of the subimages (or any combination of subimages) are clamped such that they are either "0", or if they are non-zero, they are rounded up to the maximal value (e.g., "1" or "255").

FIGS. 5-13 illustrate how a final composite image can be generated from the contributing images and their respective color channel subimages. In particular, FIGS. 5-13 show various stages of final composite image assembly in accordance with an exemplary composite image function that defines how the contributing images are to be assembled together and how the one or more color channel subimages are to be customized (e.g., in accordance with user selected color for the customizable portions represented by the color channel subimages). In FIGS. 5-13, the exemplary composite image function is positioned below the resulting composite image; additionally, in FIGS. 5-13, the components of the composite image function that are active are shown in bold, underlined, italic font.

In FIGS. 5-13 the composite image function is:

((base+[(control.RedChannel*PrimaryColor+
control.GreenChannel*SecondaryColor)+
(control.GreenChannel*control.Blue
Channel*PrimaryVisorColor+
control.BlueChannel*SecondaryVisor
Color)])*lighting.RedChannel)+
lighting.GreenChannel where "base" corresponds to the base contributing image, "control.RedChannel" corresponds to the red color channel subimage 210; "PrimaryColor" corresponds to a customizable primary color (here, for the Spartan's armor) that can be selected by a user; "control.GreenChannel" corresponds to the green color channel subimage 212; "SecondaryColor" corresponds to a customizable secondary color (here, for certain details of the Spartran's armor) that can be selected by a user; "control.BlueChannel" corresponds to the blue channel subimage 214; "PrimaryVisorColor" corresponds to a customizable primary color (here, for the Spartan's visor) that can be selected by a user; "SecondaryVisorColor" corresponds to a customizable secondary color (here, for the Spartan's visor) that can be selected by a user; "lighting.RedChannel" corresponds to the red channel subimage 310 for diffuse lighting effects; and "lighting.GreenChannel" corresponds to the green channel subimage 312 for specular lighting effects.

Figure 5:
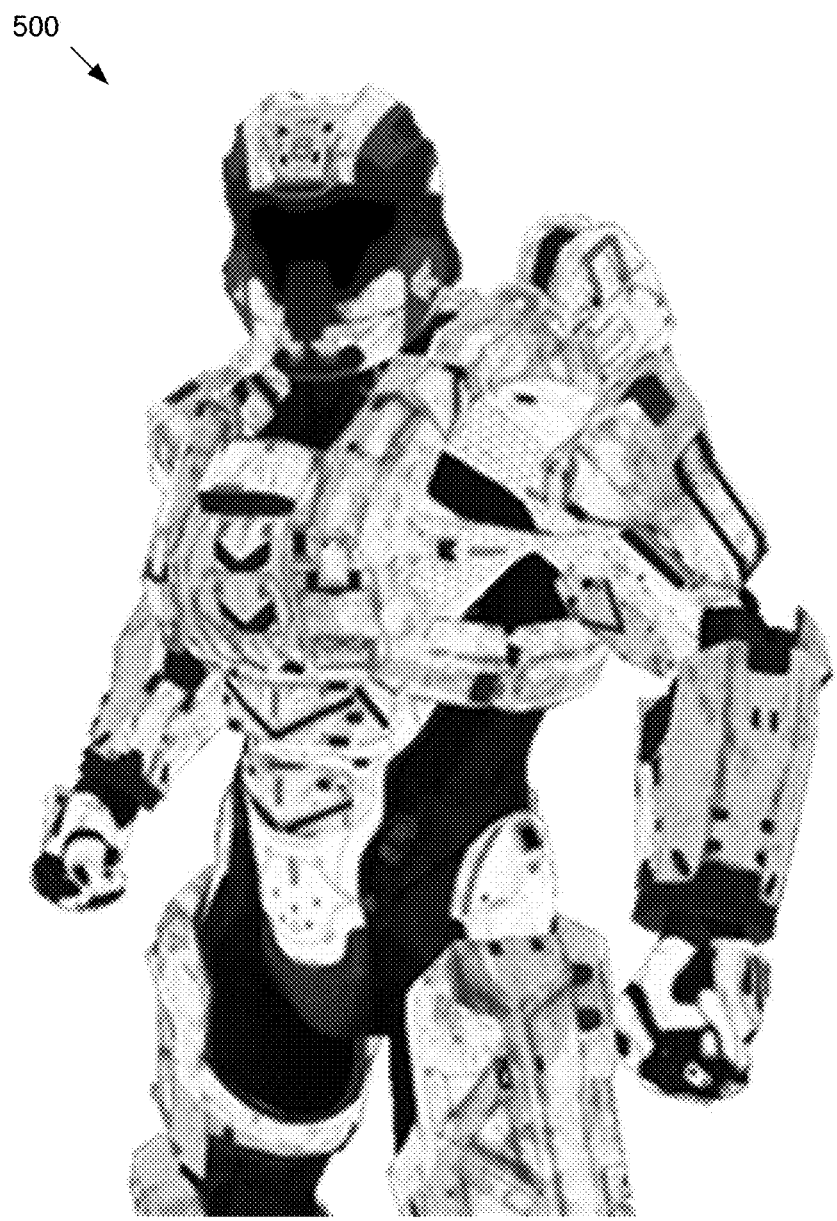
FIGS. 5-13 show various stages of final composite image assembly in accordance with an exemplary composite image function.

FIG. 5 shows a partially composed image 500 together with the composite image function 510, highlighting the active function components. The active component of the composite image function 510 in FIG. 5 is the "base" contributing image, as described above.

Figure 6:
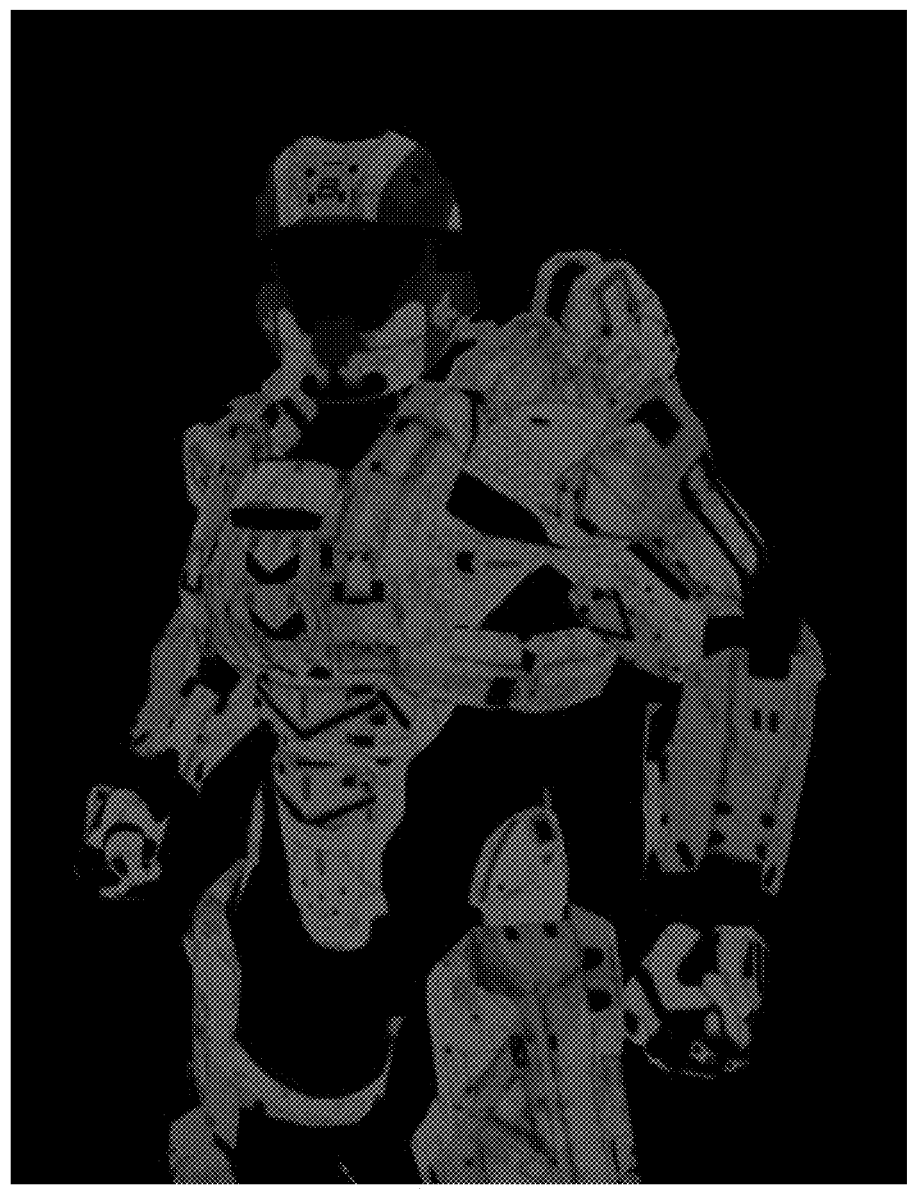

FIG. 6 show a partially composed image 600 together with the composite image function 610, highlighting the active function components. The active components of the composite image function 610 in FIG. 6 are the "control.RedChannel" m×n array as modified by the "PrimaryColor" (which corresponds to a customizable scaling function (e.g., a 1×3 vector corresponding to the selected primary color for the armor) which is multiplied by the "control.RedChannel" subimage)) added to the "control.GreenChannel" m×n array as modified by the "SecondaryColor" (which corresponds to another customizable scaling function which is multiplied by the "control.GreenChannel" subimage). Here, the partially composed image 600 shows color variations for the armor of the displayed Spartan.

Figure 7:
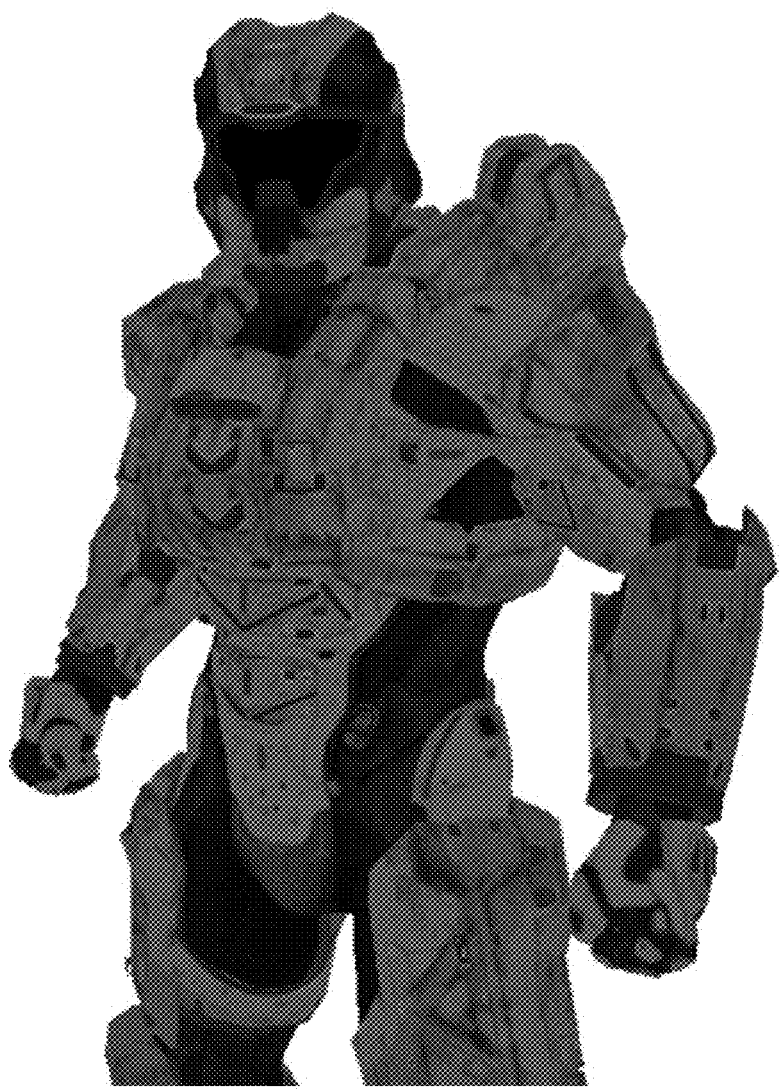

FIG. 7 shows a partially composed image 700 together with the composite image function 710, highlighting the active function components. In particular, the composite image function 710 shows that the active function components are the image 500 added with the image 600. More specifically, the active components of the composite image function 710 in FIG. 7 are the base image 500 of FIG. 5 added to the image 600 of FIG. 6. Thus, the image 700 is the additive combination of the base contributing image 500 with the image 600 (representing the red channel "armor"

subimage matrix multiplied by the selected primary color and the green channel "armor" subimage matrix multiplied by the secondary color).

Figure 8:
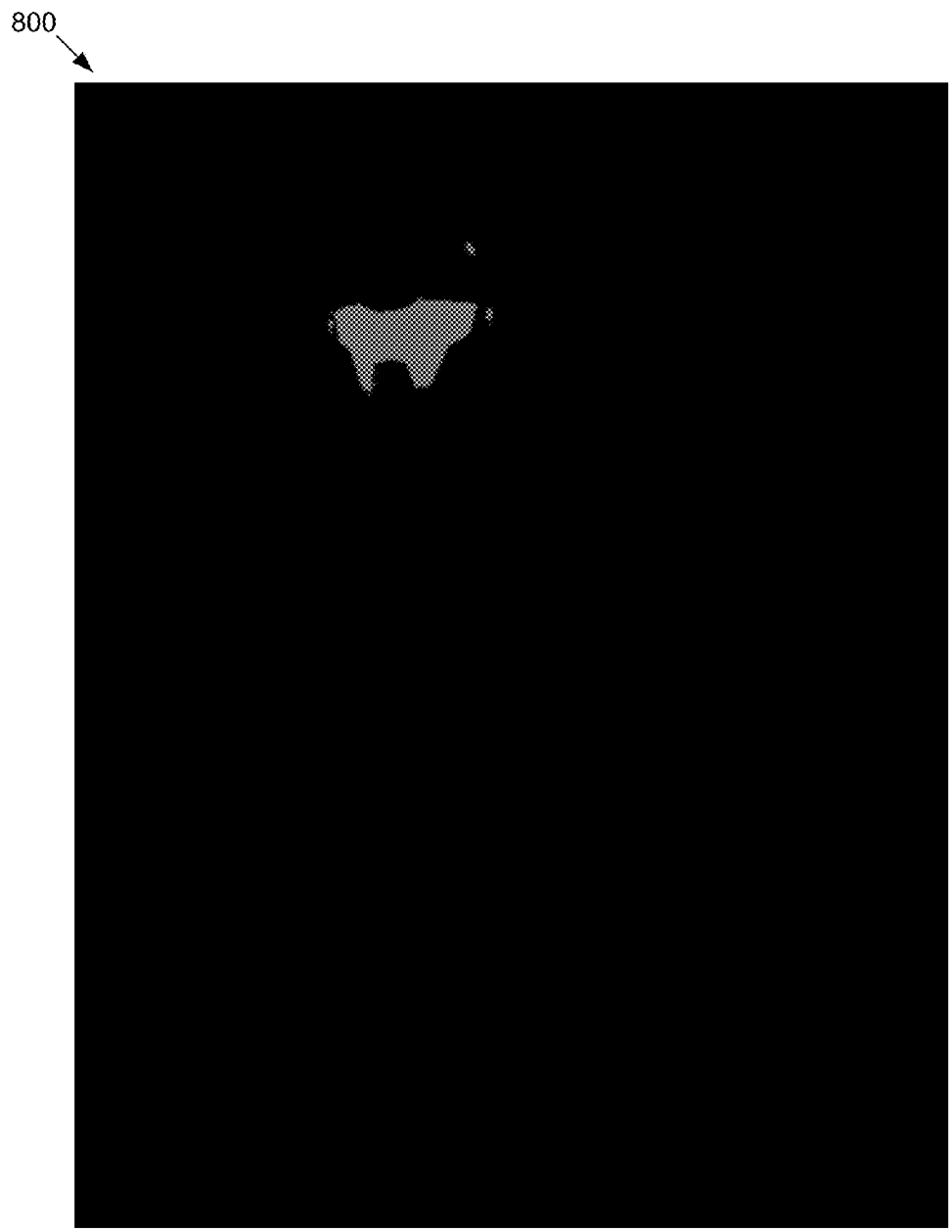

FIG. 8 shows a partially composed image 800, together with the composite image function 810, highlighting the active function components. Here, the image 800 is the multiple of "control.GreenChannel" with "control.BlueChannel" further matrix multiplied by the selected "PrimaryVisorColor" (e.g., a 1×3 vector corresponding to the selected primary visor color). FIG. 8 illustrates how two or more subimages might be multiplied (or divided, or otherwise arithmetically combined) together to create a resultant subimage used to define customizable portions. Indeed, any two or more of the subimages can be combined using any arithmetic operation, and the result may then be multiplied with one or more color choices to achieve the desired color customization. In this way, the disclosed approach offers a highly customizable mechanism for combining subimages to produce resultant arithmetic combinations of subimages that can then be modified by a selected color choice (e.g., a 1×3 vector, as described above). Further, in some embodiments, when two or more subimages are combined, the resulting values can be clamped to minimal and maximal values such that zero values remain zero, and non-zero values are rounded up to a maximal value (e.g., "1" or "255").

Figure 9:

FIG. 9 shows a partially composed image 900, together with the composite image function 910, highlighting the active function components. Here, the image 900 is "control.BlueChannel" matrix multiplied by the selected "SecondaryVisorColor" (e.g., a 1×3 vector corresponding to the selected primary visor color).

Figure 10:
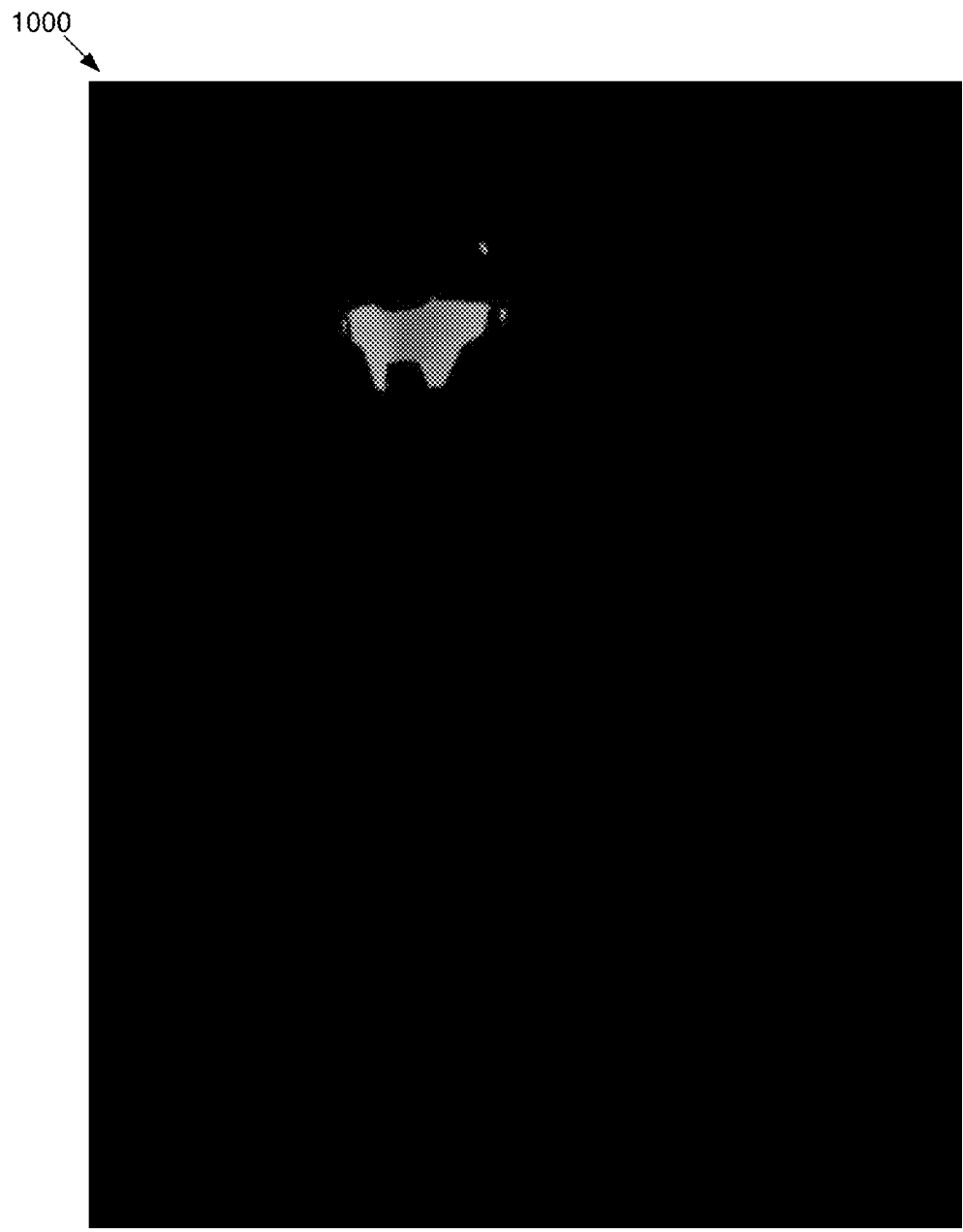

FIG. 10 shows a partially composed image 1000, together with the composite image function 1010, highlighting the active function components. Here, the image 1000 is the additive combination of image 800 with image 900, thus producing an image of the visor with both primary and secondary color selections.

Figure 11:
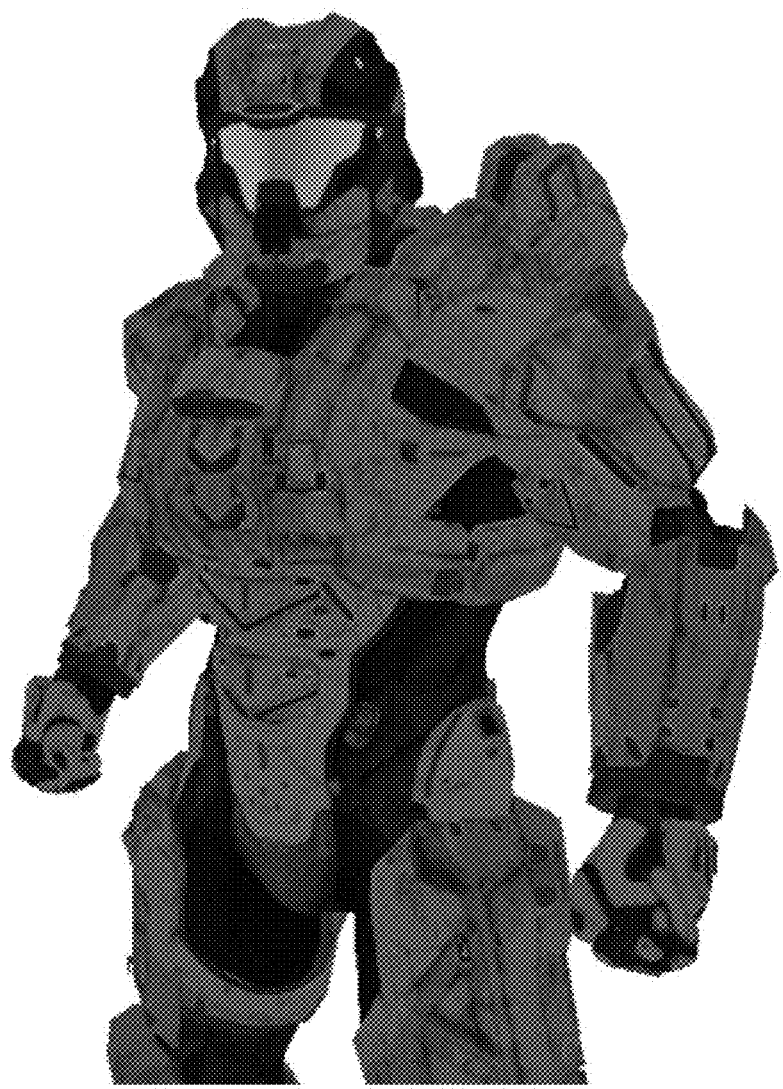

FIG. 11 shows a partially composed image 1100, together with the composite image function 1110, highlighting the active function components. Here, the image 1100 is the base image 500 of FIG. 5 additively combined with the combinatorial image 600 of FIG. 6 further additively combined with the additive image 1000 of FIG. 10. In combination, the partially composed image 1100 shows the resultant composite image before any lighting effects are applied.

Figure 12:

FIG. 12 shows a partially composed image 1200, together with the composite image function 1210, highlighting the active function components. Here, the image 1200 is the base image 500 of FIG. 5 additively combined with the combinatorial image 600 of FIG. 6 further additively combined with the additive image 1000 of FIG. 10, multiplied by the diffuse lighting subimage 310 of FIG. 3.

Figure 13:

FIG. 13 shows final image 1300, together with the composite image function 1310, highlighting the active function components. Here, the image 1300 is the resultant composite image 1300 of FIG. 12 added to the specular lighting subimage 312 of FIG. 3. In this example, the composite image function 1310 is complete, and the illustrated image 1300 includes the final RGBA image data for display. This final RGBA image data can then be transmitted to the user for display at the user's device (e.g., in any appropriate image format, including any compressed image data format).

Thus, FIGS. 5-13 illustrate how various contributing images (including various subimages) can be combined to form a resultant composite image. Further, as shown above, certain subimages can be dynamically modified to produce a desired image outcome in the resultant composite image that allows for dynamic color variation without the need for storing pre-rendered images (e.g., pre-rendered final images of every possible color combination or pre-rendered final images of image portions for each possible color combination). Instead, the disclosed technology allows for a significant memory reduction by artfully utilizing the available color channels to store subimages with image data highlighting customizable image data vs. non-customizable data. These subimages can then be dynamically modified via matrix multiplication to create resultant RGB images (m×n×3 arrays) with the desired portions adaptively colored according to a user's selection using a fraction of the memory or storage space that would otherwise be needed.

FIG. 14 is a shematic block diagram illustrating the flexibility of the composite image function can be. At 1410, example variables that can be used to create a composite image are illustrated. The example variables in 1410 track the representative example shown in FIGS. 5-13 and discussed above. In particular, the variables include three R, G, B channel arrays and an alpha channel array that together form a base image (labeled as "base 1-4"), three R, G, B channel arrays that correspond to the subimages that can be matrix multiplied to create resultant RGB images having dynamically customizable colors (labeled as "customization 5-7"), and three R, G, B channel arrays that correspond to lighting effects (labeled as "lighting 8-10"). Also shown are four color variables (labeled as "color1," "color2," "color3," and "color4"), which correspond to four user-selectable colors. As explained above, these color variables can correspond to 1×3 vectors, which when multiplied by the appropriate subimage (or combination of subimages) of the customization arrays, produce the selected color in the appropriate customizable portion of the composite image. Additional R, G, B channel arrays or additional color variables. (e.g, for additional subimages defining customizable portion of the composite image) could also be included among the available variables.

At 1412, the available variables are shown in a more general format. As noted above, the image data stored in the R, G, B or A channels does not typically correspond to actual "red", "green", "blue", or "alpha" data. Instead, the channels provide a useful mechanism for storing the subimages, base image information, and/or lighting information that can then be combined according to a composite image function to create the desired composite image having the dynamically adjusted colors correctly displayed on the customizable portions of the image. Thus, in 1412, the data stored in the RGBA channels is more generally shown as variables "var1", "var2", and so on, and which correspond to m×n arrays for data.

Functions 1420, 1422, 1424 illustrate three example composite image functions that define how the contributing images and their color-channel image are to be combined and/or modified by the color variables to produce a composite image with the customizable portions having the desired colors.

Function 1420 corresponds to the example function used to generate the composite image 1300 shown in FIG. 13. That is, the function 1420 begins with a base image (here, var1,var2,var3,var4) and adds to it a customizable image having two portions (as defined by var5 and var6) customized by two different respective colors (color1 and color2), shown as "var5*color1+var6*color2"). The resulting image is then added to another customizable image having two portions (as defined "var7*var6" and "var7" customized by two different respective colors (color3 and color4), shown as "var7*var6*color3+var7*color4". The resulting image of these additions is then multiplied by var8, which corresponds to lighting data (e.g., light diffusion data). And the result of that multiplication is then added to var9, which corresponds to additional lighting data (e.g., specular lighting data). This function illustrates how combinations of subimages can be created using arithmetic operations (e.g., through addition, subtraction, multiplication, or division) to create a new subimage that is then multiplied by a given color variable (which corresponds to the scaling factor). For instance, in function 1420, two subimages (var7 and var6) are multiplied together to create a resulting subimage that is modified by color3. This is shown as "var7*var6*color3" in function 1420.

Function 1422 shows another composite image function that applies the subimages to the selected colors in a relatively straightforward manner. In particular, the function 1422 begins with a base image (here, var1,var2,var3,var4) and then sequentially adds to it a series of customizable images having portions customized by respective selected color using matrix multiplication. In order, those combinations are "var5*color1", "var6*color2", "var7*color3+var8*color4", "var9*color5", and "var10*color6".

Function 1424 shows another composite image function for a composite image having many additional variables being combined using the principles introduced above. Function 1424 helps show the flexibility and scalability of the disclosed approach to image generation. For instance, function 1424 uses 13 subimages ("var1" through "var13") and 9 colors ("color1" through "color9").

Figure 15:
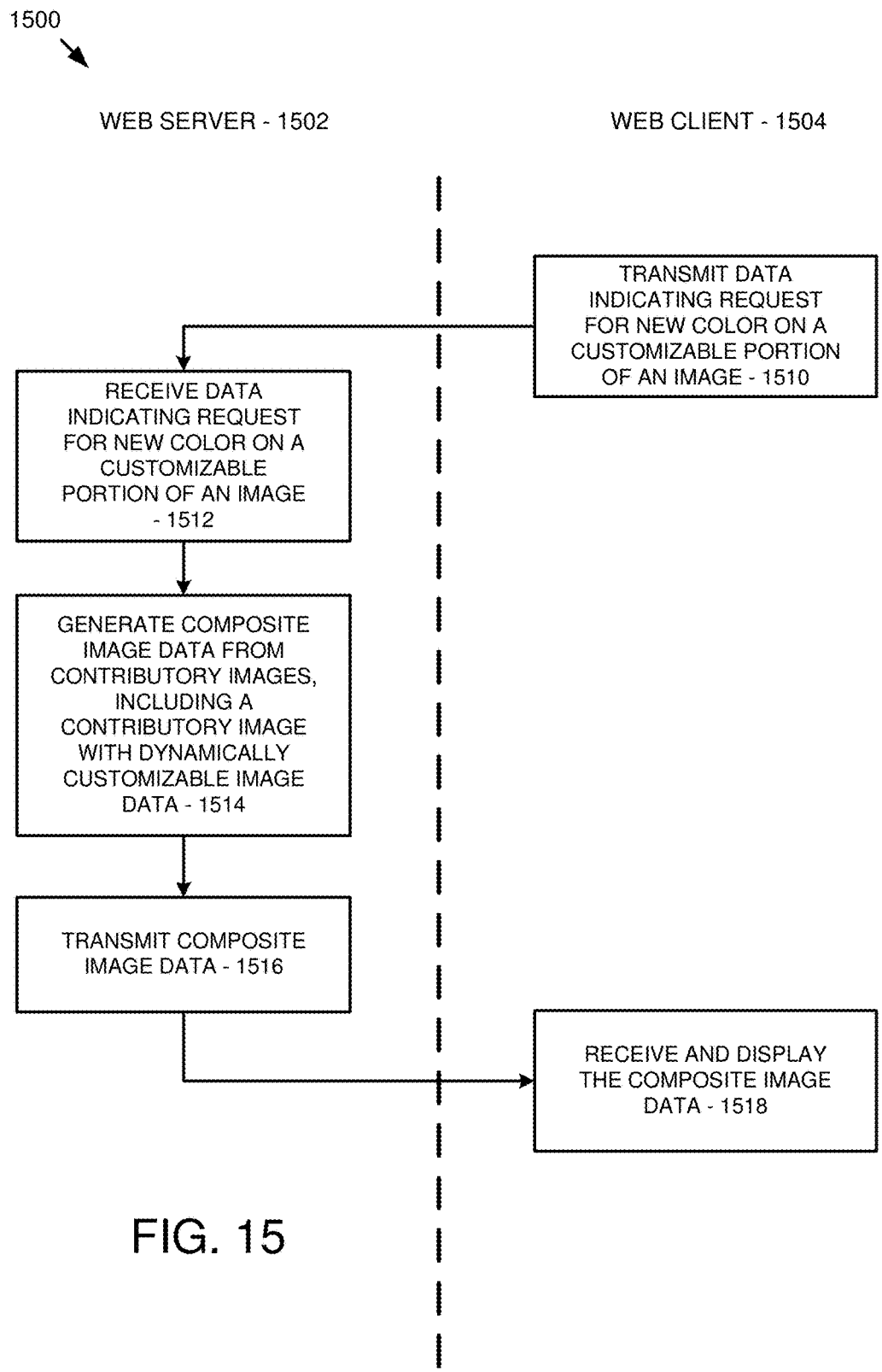
FIG. 15 is a flow chart showing one example method for generating a composite image using embodiments of the disclosed technology.

FIG. 15 is a flow chart 1500 showing one example method for generating a composite image using embodiments of the disclosed technology. In FIG. 15, the method is performed by a web server 1502 for a remote web client 1504 (e.g., a remote computer connected to the web server via the internet and executing an application in which a customizable image is displayed (via a web browser, a video game interface, or any other interface)). The web client 1504 can be any suitable computing device, such as a personal computer, laptop computer, tablet computer, gaming console, mobile device, or the like. In one example implementation, the web server 1502 is programmed to provide a web site to web clients (such as web client 1504) that includes one or more web pages in which customizable images are presented to the user. As user requests to modify a color on a customizable portion of a customizable image are received, the web server can perform an embodiment of the image generation technique disclosed herein. Although FIG. 15 shows a web-based implementation, the method can also be performed at a single computer as part of an image generation process implemented at the single computer (e.g., as part of a stand-alone program executing at the computer). Further, any of the disclosed methods or method acts can be performed with any other methods or method acts disclosed herein.

At 1510, data indicating a request for a new color to be applied to a customizable portion of an image is transmitted. For instance, a user at web client 1504 may be visiting a web site on a web browser served by web server 1502 that presents the user with various options to customize an image being displayed to the user. As noted above, such options may be presented as part of a retail website or a website supporting a video game with a customizable avatar (e.g., such as the example Spartan discussed herein).

Figure 16:
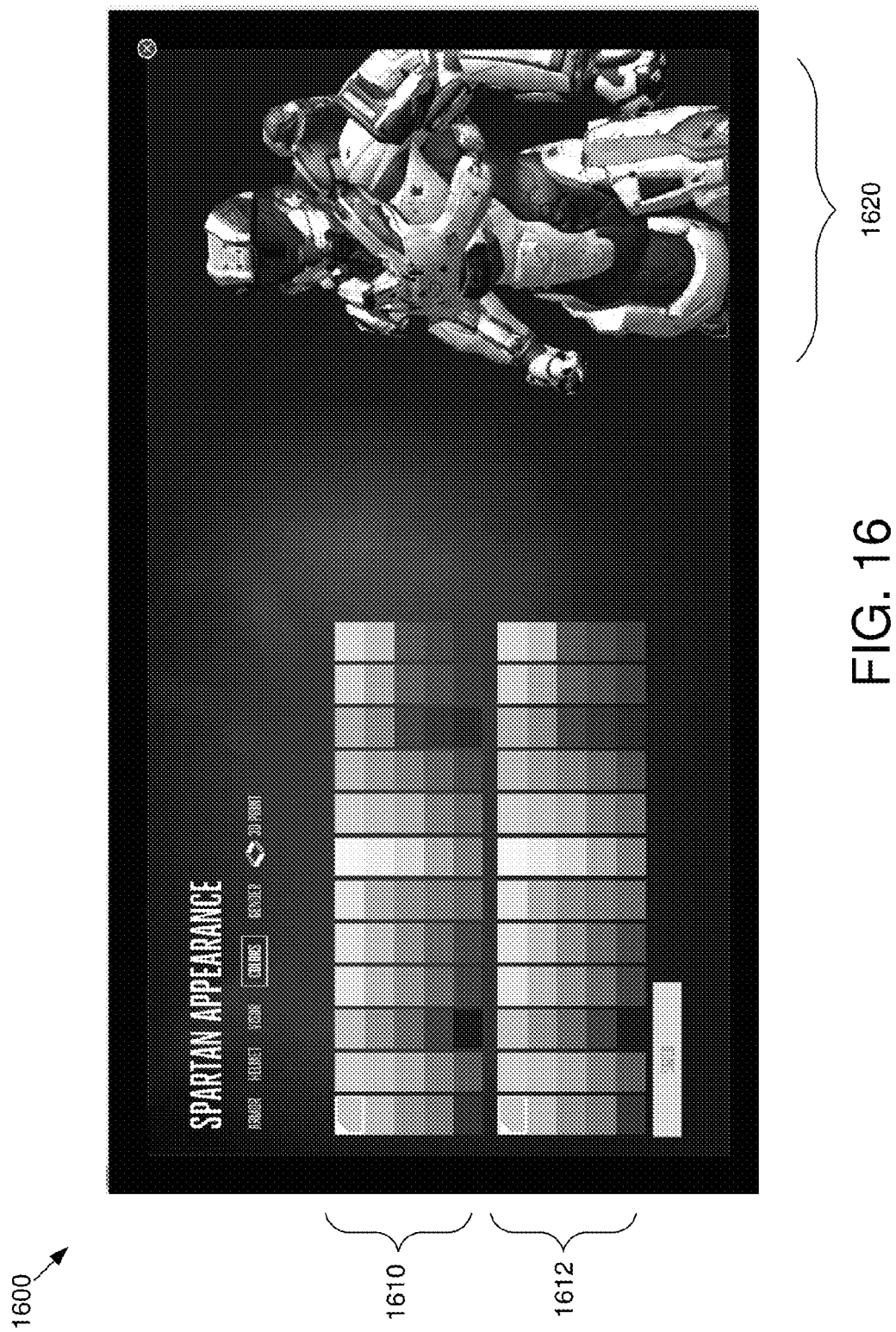
FIG. 16 shows an illustrative web page through which a user is presented with various color options for customizable image portions.

As part of the user's website experience, color options may be presented to the user for the image being viewed. As just one example, FIG. 16 shows an illustrative web page 1600 by which a user is presented with various color options for the armor of a video game avatar—here, the Spartan avatar disclosed above. In the particular web page 1600, two color pallets 1610, 1612 are displayed, each with 60 available color options. The top color pallet 1610, in this example, is used as the primary armor color for the illustrated avatar 1620, whereas the bottom color pallet 1612 is used as the secondary armor color (e.g., providing secondary details to the main armor). The user can select any available color from the top color pallet 1610 and the bottom color pallet 1612 for application to the avatar's armor. The available colors in color pallets 1610, 1612 help illustrate the advantages of the disclosed technology in that the available color combinations shown in FIG. 16 represent 2400 color combinations which would normally have to be pre-rendered, but with embodiments of the disclosed technology, those color combinations can be dynamically generated using only a fraction of the memory or storage otherwise necessary.

Returning to FIG. 15, at 1512, the data indicating the request for a new color to be displayed on a customizable portion of the image is received at the web server 1502. This data can be input as part of a web server process (e.g., buffered into memory or otherwise prepared for further processing).

At 1514, composite image data for displaying the composite image from a plurality of contributing images is generated. For instance, the contributing images can comprise a first contributing image with base image information and a second contributing image with customizable color information. The contributing images can further include a third contributing image having lighting information. In certain embodiments, the second contributing image has one or more color channel subimages, each color channel subimage having dynamically customizable image data for one or more customizable portions of the composite image. In particular embodiments, the generating further comprises altering the dynamically customizable image data of one or more of the color channel subimages of the second contributing image responsive to the received user selection. In some embodiments, the generating the composite image data is performed by applying a function (e.g., a composite image function, as discussed above) that dictates how the contributing images are to be combined and how the dynamically customizable image data of the one or more of the color channel subimages of the second contributing image are to be scaled responsive to the received user selection. In certain embodiments, the generating the composite image data is performed in part by applying a scaling factor to the image data values of one of the color channel subimages. The scaling factor can comprise, for example, a 1×3 vector or a 1×4 vector that is matrix multiplied with the image data values of the one of the color channel subimages, thereby producing a complete RGB or RGBA image that can then be added or otherwise combined with the contributing images to form the final composite image. More generally, the scaling factor can be any 1×z vector where z is an integer value greater than 2 that represents the number of available color components for the color space in which the composite image will be displayed (e.g., RGB, YUV, CMYK, YIQ, YPbPr, xvYCC, HSV, HSL, etc.) In further embodiments, the scaling factor is determined based on the received user selection (e.g., using a scaling factor table). In some embodiments, each of the color channel subimages defines a different customizable portion of the composite image. Further, in some cases, one or more of the color channel subimages comprise image data values that do not visually contribute to the composite image.

At 1516, composite image data as generated at 1514 is transmitted to the web client 1504. For example, the composite image data can comprise RGBA data (e.g., an m×n×4 array) with the RGBA values of the final composite image. The composite image data can also be compressed image data according to any suitable image format. Still further, the image data can be in any suitable image format.

At 1518, the composite image data is received at the web client 1504 and, in some embodiments, displayed on a web browser being executed at the web client 1504.

Figure 17:
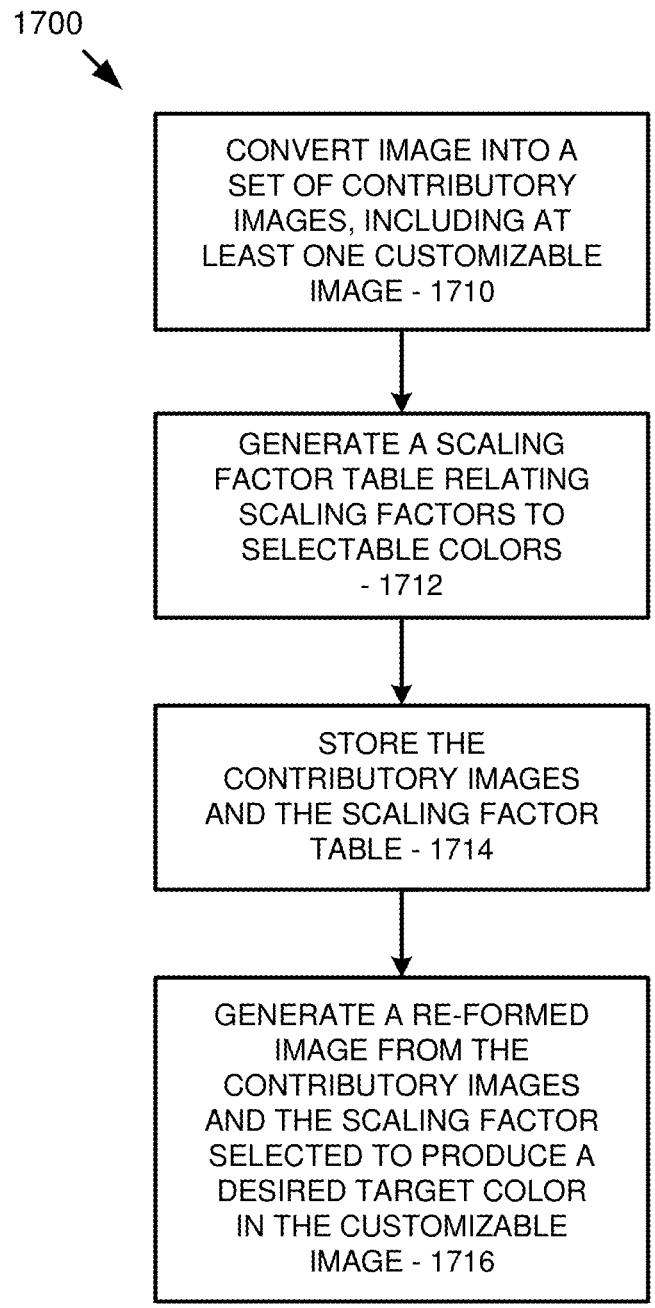
FIG. 17 is a flow chart showing one example method for producing data components used to dynamically generate a composite image according to embodiments of the disclosed technology.

FIG. 17 is a flow chart 1700 showing one example method for producing the data components used to dynamically generate a composite image according to embodiments of the disclosed technology. The example method can be performed as part of creating or delivering a website that present an image to the user having user-customizable image portions. For instance, and as noted above, such functionality may be part of a retail website that offers product customization, a video game website that allows a user to modify their in-game avatar to have user-selected coloring schemes, or any other type of website where dynamic image customization is desired. Further, any of the disclosed methods or method acts can be performed with any other methods or method acts disclosed herein.

At 1710, an image is converted into a set of contributing images that, when combined, re-form the image. In this embodiment, the contributing images include at least one customizable image having image data values that do not visually contribute to the image when reformed and having image data values that do visually contribute to the image when re-formed and that are adjustable by application of a scaling factor. In further embodiments, the contributing images also include a base image and/or a lighting image.

At 1712, a scaling factor table is generated relating scaling factors to colors such that upon receipt of a user request to alter a color in the customizable image to a desired target color, the proper scaling factor to apply to the customizable image to create the desired target color in the customizable image is returned.

At 1714, the contributing images and the scaling factor table are stored. Notably, this approach does not rely on pre-rendered images of all possible color combinations to provide the desired customization function, thereby resulting in a significant reduction in the memory overhead needed to generate all possible customization combinations. In other words, in certain embodiments, the storage of a pre-rendered version of the image incorporating the desired target color is omitted.

At 1716, a re-formed image is generated from the contributing images and a scaling factor selected from the scaling factor table to produce a desired target color in the customizable image. For example, in some embodiments, the generating comprises applying a function (e.g., a composite image function) that defines an order in which the contributing images are combined to reform the image and applies the scaling factor to the customizable image. In particular embodiments, the generating is performed without using a pre-rendered version of the image incorporating the desired target color.

Figure 18:
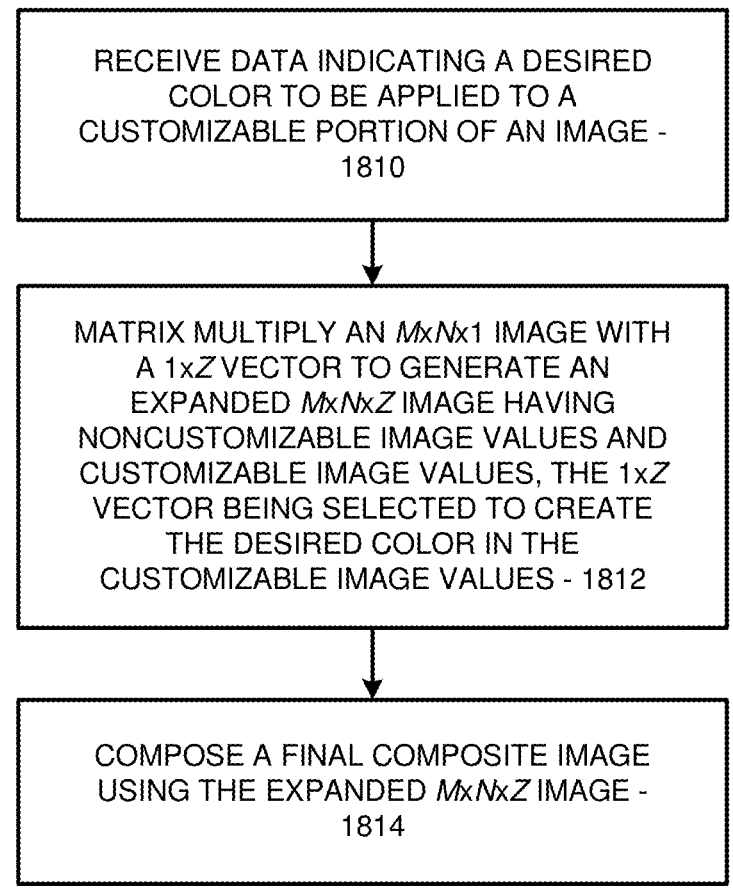
FIG. 18 is a flow chart showing another example method for generating a composite image using embodiments of the disclosed technology.

FIG. 18 is a flow chart 1800 showing one example method for generating a composite image using embodiments of the disclosed technology. In FIG. 18, the method is performed by a web server for a remote web client (e.g., a remote computer connected to the web server via the internet and executing an application in which a customizable image is displayed (via a web browser, a video game interface, or any other interface)). The web client can be any suitable computing device, such as a personal computer, laptop computer, tablet computer, gaming console, mobile device, or the like. In one example implementation, the web server is programmed to provide a web site to web clients that includes a one or more web pages through which customizable images are presented to the user. As user requests to modify a color on a customizable portion of a customizable image are received, the web server can perform an embodiment of the image generation technique disclosed herein. Although FIG. 18 shows a web-based implementation, the method can also be performed at a single computer as part of an image generation process implemented at the single computer (e.g., as part of a stand-alone program executing at the computer). Further, any of the disclosed methods or method acts can be performed with any other methods or method acts disclosed herein.

At 1810, data is received (e.g., input, buffered into memory, or otherwise prepared for further processing) indicating a desired color to be applied to a customizable portion of an image to be displayed. For example, the data can be received from a web client and indicate a desired colored to be displayed to a customizable portion of an image displayed at the web client (e.g., on a website being accessed by the web client, on a video game interface being displayed at the web client, or on another application being executed at the web client).

At 1812, an m×n×1 image is matrix multiplied with a 1×z vector to generate an expanded m×n×z image, where m and n are positive integer values and z is a positive integer value greater than or equal to 2. In this example, the expanded m×n×z image has noncustomizable image values and customizable image values corresponding to the customizable portion of the image to be displayed. Further, in this example, the 1×z vector is selected such that the customizable image values create the desired color in the customizable portion of the image when matrix multiplied by the 1×z vector. For instance, the data from the web client indicating the desired color can be converted into the 1×z vector (e.g., using a conversion table, conversion formula, or other conversion mechanism)

At 1812, a final composite image is composed using, at least in part, the expanded m×n×z image. In some embodiments, for example, the composing can comprise combining the expanded m×n×z image with one or more of a noncustomizable base image or a noncustomizable image that adds a lighting effect to the final composite image.

In particular embodiments involving a web client, the data corresponding to the final composite image can then be transmitted to the web client. As noted, the data transmitted can have a variety of formats, including a compressed format.

IV. Example Computing Environments

Figure 19:
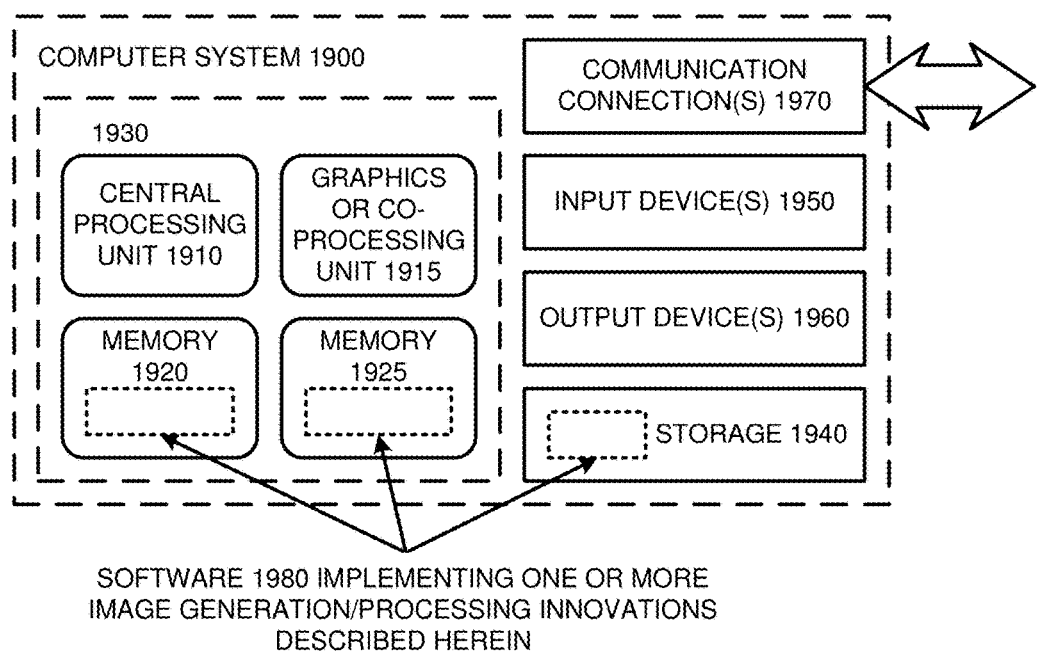
FIG. 19 illustrates a generalized example of a suitable computer system in which the described innovations may be at least in part implemented.

FIG. 19 illustrates a generalized example of a suitable computer system 1900 in which the described innovations may be implemented. The example computer system 1900 can be, for example, a computer system that is part of a server (e.g., a single server or a cloud-based server) programmed to deliver customized images to a client computer. For instance, the server may be a web server programmed to deliver content for a web site, including customizable images. The server may also be a web server providing content to a remote web client (e.g., a gaming console)

where customizable images are displayed to a user. The example computer system 1900 can also be part of a client system (e.g., a web client) that is connected to the server (e.g., via the internet, LAN, WAN, or other connection) and at which the customizable image is displayed. The client system can be, for example, a remote computing system executing a web browser, a gaming console executing a game having customizable elements, or any other remote computing system executing an application offering customizable images. The example computer system 1900 can alternatively be part of a computing system (e.g., a gaming system) that performs the disclosed methods in a stand-alone fashion (e.g., as part of a dedicated software program having an image customization functionality (such as character customization portions of a video game)). The computer system 1900 is not intended to suggest any limitation as to scope of use or functionality, as the innovations may be implemented in diverse general-purpose or special-purpose computer systems.

With reference to FIG. 19, the computer system 1900 includes one or more processing devices 1910, 1915 and memory 1920, 1925. The processing devices 1910, 1915 execute computer-executable instructions. A processing device can be a general-purpose CPU, GPU, processor in an ASIC, FPGA, or any other type of processor. In a multi-processing system, multiple processing units execute computer-executable instructions to increase processing power. For example, FIG. 19 shows a CPU 1910 as well as a GPU or co-processing unit 1915. The tangible memory 19120, 1925) may be volatile memory (e.g., registers, cache, RAM), non-volatile memory (e.g., ROM, EEPROM, flash memory, NVRAM, etc.), or some combination of the two, accessible by the processing device(s). The memory 1920, 1925 stores software 1980 implementing one or more innovations described herein, in the form of computer-executable instructions suitable for execution by the processing device(s).

A computer system may have additional features. For example, the computer system 1900 includes storage 1940, one or more input devices 1950, one or more output devices 1960, and one or more communication connections 1970. An interconnection mechanism (not shown) such as a bus, controller, or network interconnects the components of the computer system 1900. Typically, operating system software (not shown) provides an operating environment for other software executing in the computer system 1900, and coordinates activities of the components of the computer system 1900.

The tangible storage 1940 may be removable or non-removable, and includes magnetic disks, magnetic tapes or cassettes, optical storage media such as CD-ROMs or DVDs, or any other medium which can be used to store information and which can be accessed within the computer system 1900. The storage 1940 stores instructions for the software 1980 implementing one or more innovations described herein.

The input device(s) 1950 may be a touch input device such as a keyboard, mouse, pen, or trackball, a voice input device, a scanning device, or another device that provides input to the computer system 1900. For video or image input, the input device(s) 1950 may be a camera, video card, TV tuner card, screen capture module, or similar device that accepts video input in analog or digital form, or a CD-ROM or CD-RW that reads video input into the computer system 1900. The output device(s) 1960 include a display device.

The output device(s) may also include a printer, speaker, CD-writer, or another device that provides output from the computer system 1900.

The communication connection(s) 1970 enable communication over a communication medium to another computing entity. For example, the communication connection(s) 1970 can connect the computer system 1900 to the internet and provide the website functionality described herein. The communication medium conveys information such as computer-executable instructions, audio or video input or output, image data, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations presented herein can be described in the general context of computer-readable media. Computer-readable media are any available tangible media that can be accessed within a computing environment. By way of example, and not limitation, with the computer system 1900, computer-readable media include memory 1920, 1925, storage 1940, and combinations of any of the above. As used herein, the term computer-readable media does not cover, encompass, or otherwise include carrier waves or signals per se.

The innovations can be described in the general context of computer-executable instructions, such as those included in program modules, being executed in a computer system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or computer device. In general, a computer system or computer device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC such as an ASIC digital signal processor ("DSP"), a GPU, or a programmable logic device ("PLD") such as a field programmable gate array ("FPGA")) specially designed or configured to implement any of the disclosed methods.

V. Concluding Remarks

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

What is claimed is:

1. A system, comprising:
a memory or storage device; and
one or more processors, the one or more processors being configured to generate composite image data for a composite image by:
receiving data indicating a request for a color on a customizable portion of a composite image; and
generating composite image data for displaying the composite image from two or more contributing images, the contributing images including a first contributing image with base image information, and a second contributing image with customizable color information, the second contributing image further having one or more color channel subimages, each color channel subimage having dynamically customizable image data for one or more customizable portions of the composite image,
wherein the generating further comprises altering the dynamically customizable image data of one or more of the color channel subimages of the second contributing image responsive to the received user selection, thereby reducing memory overhead by dynamically generating the composite image data without using a pre-rendered image incorporating the received user selection.

2. The system of claim 1, wherein the generating the composite image data is performed in part by applying a scaling factor to the image data values of one of the color channel subimages.

3. The system of claim 2, wherein the scaling factor comprises a 1×3 or a 1×4 vector that is matrix multiplied with the image data values of the one of the color channel subimages.

4. The system of claim 3, wherein the one or more processors are further configured to determine the scaling factor based on the received user selection.

5. The system of claim 1, wherein each of the color channel subimages defines a different customizable portion of the composite image.

6. The system of claim 1, wherein one or more of the color channel subimages comprise image data values that do not visually contribute to the composite image.

7. The system of claim 1, wherein the contributing images further comprise a third contributing image with lighting information.

8. The system of claim 1, wherein the request for a color is received from a client computer executing a web browser, and wherein the method further comprises transmitting data corresponding to the composite image data to the client computer for display via the web browser.

9. One or more memory or storage devices storing computer-executable instructions, which when executed by a compute cause the computer to perform a method, the method comprising:
receiving data indicating a request for a color on a customizable portion of a composite image; and
generating composite image data for displaying the composite image from two or more contributing images, the contributing images including a first contributing image with base image information, and a second contributing image with customizable color information, the second contributing image further having one or more color channel subimages, each color channel subimage having dynamically customizable image data for one or more customizable portions of the composite image,
wherein the generating further comprises altering the dynamically customizable image data of one or more of the color channel subimages of the second contributing image responsive to the received user selection, thereby reducing memory overhead by dynamically generating the composite image data without using a pre-rendered image incorporating the received user selection.

10. The one or more memory or storage devices of claim 9, wherein the generating the composite image data is performed by applying a function that dictates how the two or more contributing images are to be combined and how the dynamically customizable image data of the one or more of the color channel subimages of the second contributing image is to be scaled responsive to the received user selection.

11. The one or more memory or storage devices of claim 9, wherein the generating the composite image data is performed in part by applying a scaling factor to the image data values of one of the color channel subimages.

12. The one or more memory or storage devices of claim 9, wherein each of the color channel subimages defines a different customizable portion of the composite image.

13. The one or more memory or storage devices of claim 9, wherein one or more of the color channel subimages comprise image data values that do not visually contribute to the composite image.

14. The one or more memory or storage devices of claim 9, wherein the contributing images further comprise a third contributing image with lighting information.

15. The one or more memory or storage devices of claim 9, wherein the request for a color is received from a client computer executing a web browser, and wherein the method further comprises transmitting data corresponding to the composite image data to the client computer for display via the web browser.

16. A system, comprising:
a memory or storage device; and
one or more processors, the one or more processors being configured to generate composite image data for a composite image by:
receiving data indicating a request for a color on a customizable portion of a composite image; and
generating composite image data for displaying the composite image from two or more contributing images, the contributing images including a first contributing image with base image information, and a second contributing image with customizable color information, the second contributing image further having one or more color channel subimages, each color channel subimage having dynamically customizable image data for one or more customizable portions of the composite image,
wherein the generating the composite image data is performed by applying a function that dictates how the two or more contributing images are to be combined and how the dynamically customizable image data of the one or more of the color channel subimages of the second contributing image is to be scaled responsive to the received user selection.

17. The system of claim 16, wherein the generating the composite image data is performed in part by applying a scaling factor to the image data values of one of the color channel subimages.

18. The system of claim 16, wherein one or more of the color channel subimages comprise image data values that do not visually contribute to the composite image.

19. The system of claim 16, wherein the contributing images further comprise a third contributing image with lighting information.

20. The system of claim 16, wherein the request for a color is received from a client computer executing a web browser, and wherein the method further comprises transmitting data corresponding to the composite image data to the client computer for display via the web browser.

* * * * *